United States Patent
Novik et al.

(10) Patent No.: US 9,372,882 B2
(45) Date of Patent: Jun. 21, 2016

(54) PARTITIONING ONLINE DATABASES

(71) Applicant: Microsoft Technology Licensing, LLC, Redmond, WA (US)

(72) Inventors: Lev Novik, Bellevue, WA (US); Andrew Kimball, Sammamish, WA (US); Tony Petrossian, Bellevue, WA (US); Cihangir Biyikoglu, Issaquah, WA (US); Santeri Olavi Voutilainen, Seattle, WA (US); Tomas Talius, Sammamish, WA (US); Istvan Cseri, Seattle, WA (US); Joachim Hammer, Redmond, WA (US); Jason D. Clark, Woodinville, WA (US); Marc T. Friedman, Seattle, WA (US); Ajay Kalhan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/451,866

(22) Filed: Aug. 5, 2014

(65) Prior Publication Data

US 2014/0344221 A1 Nov. 20, 2014

Related U.S. Application Data

(62) Division of application No. 13/165,557, filed on Jun. 21, 2011, now Pat. No. 8,805,784.

(60) Provisional application No. 61/407,579, filed on Oct. 28, 2010.

(51) Int. Cl.
G06F 17/30 (2006.01)

(52) U.S. Cl.
CPC .... G06F 17/30377 (2013.01); G06F 17/30566 (2013.01); G06F 17/30575 (2013.01); G06F 17/30584 (2013.01); Y10S 707/964 (2013.01); Y10S 707/971 (2013.01)

(58) Field of Classification Search
CPC .............. G06F 17/30339; G06F 17/30377; G06F 17/30566; G06F 17/30575; G06F 17/30584

USPC .......... 707/609, 626, 633, 634, 636
See application file for complete search history.

(56) References Cited

U.S. PATENT DOCUMENTS

| 5,625,815 A | 4/1997 | Maier et al. |
| 6,240,428 B1 | 5/2001 | Yeung |

(Continued)

FOREIGN PATENT DOCUMENTS

| CN | 1534518 | 10/2004 |
| CN | 101276364 | 10/2008 |

OTHER PUBLICATIONS

U.S. Appl. No. 61/407,579, filed Oct. 28, 2010, Novik, et al.
Windows Sharepoint Services, "Merge Content Databases(Windows SharePoint Services 3.0)", May 14, 2009, 1 pages.
MSDN.Microsoft.com, "Building a Scalable, Multi-Tenant Application for Windows Azure", Available at least as early as Nov. 16, 2010, 27 pages.

(Continued)

*Primary Examiner* — Hares Jami
(74) *Attorney, Agent, or Firm* — Nicholas Chen; Doug Baker; Micky Minhas

(57) ABSTRACT

Methods, systems, and computer program products are provided for partitioning online databases. Online database operations, such as, for example, SPLIT, MERGE, and DROP, are used to alter the arrangement of partitions in a federated database. A SPLIT operation splits rows at one partition across a plurality of other partitions. A MERGE operation merges rows at a plurality of partitions in to one partition. A DROP operation shifts responsibility for rows of data from one partition to another partition and then drops the rows from the one partition.

15 Claims, 11 Drawing Sheets

(56) References Cited

U.S. PATENT DOCUMENTS

| | | |
|---|---|---|
| 6,748,393 B1 | 6/2004 | Kapoor |
| 7,035,851 B1 | 4/2006 | Sinclair et al. |
| 2007/0192273 A1* | 8/2007 | Hempelmann ... G06F 17/30377 707/999.001 |
| 2009/0106285 A1* | 4/2009 | Cheung ............ G06F 17/30604 707/999.101 |
| 2010/0030995 A1* | 2/2010 | Wang ................ G06F 17/30339 711/173 |
| 2010/0223231 A1 | 9/2010 | Lee |
| 2010/0223297 A1 | 9/2010 | Li |
| 2010/0281013 A1 | 11/2010 | Graefe |
| 2012/0109892 A1 | 5/2012 | Novik et al. |

OTHER PUBLICATIONS

Satoh, Ichiro, "Dynamic Federation of Partitioned Applications in Ubiquitous Computing Environments", 2004, 5 pages.
U.S. Appl. No. 13/165,557, Feb. 27, 2014, Office Action.
U.S. Appl. No. 13/165,557, Apr. 14, 2014, Notice of Allowance.
First Office Action and Search Report Received for Chinese Patent Application No. 201110355942.8, Mailed Date: Dec. 4, 2013, 11 Pages.
Second Office Action received for Chinese Patent Application No. 201110355942.8, Mailed Date: May 22, 2014, 8 Pages.
Notice of allowance Received in China Patent Application No. 201110355942.8, Mailed Date: Sep. 29, 2014, 8 Pages.

* cited by examiner

PARTITIONING ONLINE DATABASES

CROSS-REFERENCE TO RELATED APPLICATIONS

This application is a division of U.S. patent application Ser. No. 13/165,557 filed on Jun. 21, 2011, entitled "PARTITIONING ONLINE DATABASES," which issued as U.S. Pat. No. 8,805,784 on Aug. 12, 2014, which claims the benefit of U.S. Provisional Patent Application No. 61/407,579, entitled "PARTITIONING AND RE-PARTITIONING ONLINE DATABASES", filed on Oct. 28, 2010, both of which are incorporated herein in their entireties.

BACKGROUND OF THE INVENTION

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

In some computing environments, databases are used to manage sets of data. The size of many data sets is relatively small. These smaller data sets can be stored using the resources of a single computer system. However, other data sets are larger. To store a larger data set, the data set is partitioned into a plurality of database partitions and different partitions are then stored at different computer systems. For example, social networking sites can have hundreds of millions of users. These social networking sites can store user related data for their users in partitioned databases that are distributed across many computer systems.

In some environments, sharding is used to partition a database. Sharding is a form of horizontal partitioning that splits (partitions) one or more tables by row across multiple databases. Horizontal partitioning reduces index size by using multiple smaller index sizes across a single instance of a schema (or same logical server). Sharding goes further by splitting (partitioning) one or more tables across multiple servers (logical of physical). As such, sharding enables distribution of a larger database over multiple machines, improving performance.

However, sharding is difficult to implement. Sharding typically requires hand-coding by an experienced developer or database administrator. Some mechanisms have been developed to at least in part automate sharding. However, these mechanisms are typically implemented and/or utilized at the application layer (as opposed to the database layer). As such, these mechanisms require complex application coordination to work as intended.

Further, over time, the volume and/or arrangement of data in a database or database partitions can change. As such, a database may need to be re-partitioned to more evenly allocate the use of computer system resources, optimize performance, etc. Re-partitioning can include adding new partitions, removing existing partitions, and transferring data between partitions. Unfortunately, re-partitioning typically requires all affected partitions to be taken offline during the re-partitioning process. As such, during re-partitioning users may be unable to access data for (potentially extended) periods of time.

BRIEF SUMMARY

The present invention extends to methods, systems, and computer program products for partitioning online databases. In some embodiments, a database partition is split into a plurality of database partitions. A partition splitting directive is received. The partition splitting directive indicates how to divide the database partition into at least a first portion and a second portion to split the rows of data stored in the database partition.

A split operation is executed to split the database partition in accordance with the partition splitting directive and while the database partition remains online. Splitting includes establishing a first new database partition to store rows of data corresponding to the first portion and establishing a second new database partition to store rows of data corresponding to the second portion of the specified subset of federation key values One or more of a copy stream and an update stream are established from the database partition to each of the first and second new database partitions. For each of one or more rows of data from the database partition, the row of data is filtered to identify one of the first new database partition and the second new database partition as the appropriate destination for the row of data. Each of the one or more rows of data, as well as updates thereto, is transferred from the database partition to the appropriate destination database over the appropriate stream in accordance with the results of the filtering.

In other embodiments, database partitions are merged. A partition merging directive is received. The partition merging directive indicates how to merge together rows of data stored in a plurality of database partitions. A merge operation is executed to merge the rows of data together in accordance with the partition merging directive and while the plurality of database partitions remains online. Merging includes establishing a new database partition to store the rows of data. One or more of a copy stream and an update stream are established from each of the plurality of database partitions to the new database partition. Each of rows of data, as well as updates thereto, is transferred from the plurality of database partitions to the new database partition over the appropriate stream.

In further embodiments, rows of data are dropped from a distributed database system. A partition drop directive is received. The partition drop directive indicates how to drop one or more rows of data stored across a plurality of database partitions. A drop operation is executed to drop rows of data in accordance with the partition drop directive and while the plurality of database partitions remain online. Dropping includes, for each database partition that is to drop one or more rows of data, accessing identifiers for rows of data that are to be dropped from the database partition. Responsibility of other database partitions is expanded to configure the other database partitions to store the rows of data that are to be dropped. The rows of data are removed from the database partition.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
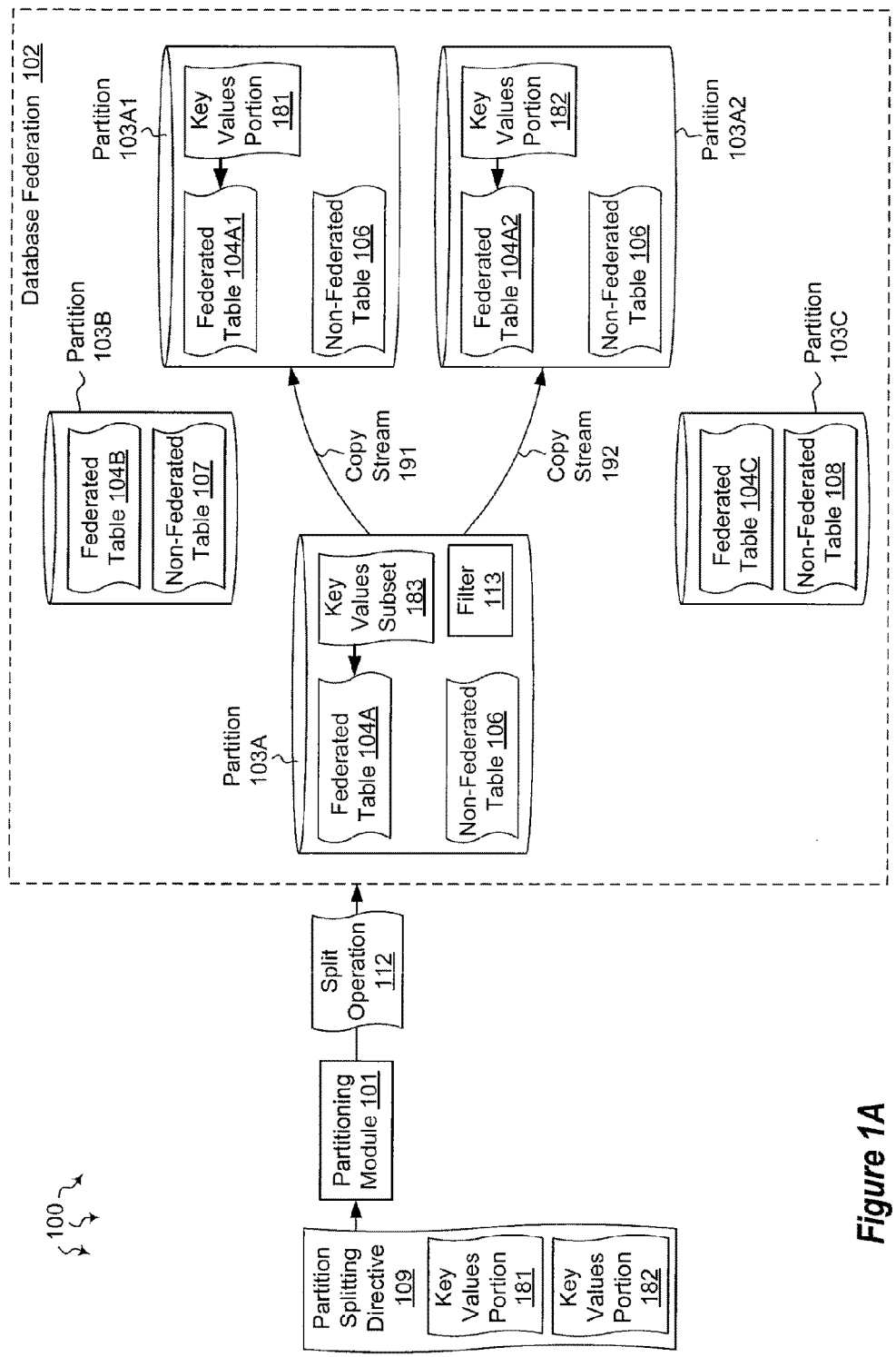
FIGS. 1A and 1B illustrate an example computer architecture that facilitates splitting a database partition.

The present invention extends to methods, systems, and computer program products for partitioning online databases. In some embodiments, a database partition is split into a plurality of database partitions. A partition splitting directive is received. The partition splitting directive indicates how to divide the database partition into at least a first portion and a second portion to split the rows of data stored in the database partition.

A split operation is executed to split the database partition in accordance with the partition splitting directive and while the database partition remains online. Splitting includes establishing a first new database partition to store rows of data corresponding to the first portion and establishing a second new database partition to store rows of data corresponding to the second portion of the specified subset of federation key values One or more of a copy stream and an update stream are established from the database partition to each of the first and second new database partitions. For each of one or more rows of data from the database partition, the row of data is filtered to identify one of the first new database partition and the second new database partition as the appropriate destination for the row of data. Each of the one or more rows of data, as well as updates thereto, is transferred from the database partition to the appropriate destination database over the appropriate stream in accordance with the results of the filtering.

In other embodiments, database partitions are merged. A partition merging directive is received. The partition merging directive indicates how to merge together rows of data stored in a plurality of database partitions. A merge operation is executed to merge the rows of data together in accordance with the partition merging directive and while the plurality of database partitions remains online. Merging includes establishing a new database partition to store the rows of data. One or more of a copy stream and an update stream are established from each of the plurality of database partitions to the new database partition. Each of rows of data, as well as updates thereto, is transferred from the plurality of database partitions to the new database partition over the appropriate stream.

In further embodiments, rows of data are dropped from a distributed database system. A partition drop directive is received. The partition drop directive indicates how to drop one or more rows of data stored across a plurality of database partitions. A drop operation is executed to drop rows of data in accordance with the partition drop directive and while the plurality of database partitions remain online. Dropping includes, for each database partition that is to drop one or more rows of data, accessing identifiers for rows of data that are to be dropped from the database partition. Responsibility of other database partitions is expanded to configure the other database partitions to store the rows of data that are to be dropped. The rows of data are removed from the database partition.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention include the use of database federations. A database federation is a collection of one or more federation members (partitions) defined by a federation scheme. A federation scheme defines one or more of: the federation key(s), their data type(s), and the distribution type (range, hash, . . . ). Each federation can have its own federation scheme. Thus, each member of a federation can contain one or more federation units (i.e., data that share a common key). Federation members can be visible in an application model and are identified through their federation key ranges.

Federations can be created in any database. There can be many federations in a database, each federation representing a separate collection of tables such as 'all customer data' or 'all order data', and each federation member can contain a subset of the full dataset. (However, it is also possible for a single federation member to contain a whole of the collection of tables).

At a lower level of granularity, atomic units are collections of rows of one or more tables which have a common value for the federation key. An atomic unit cannot be subdivided any further. One or more atomic units can be grouped into a federation member to simplify manageability.

In addition to containing rows from partitioned or federated tables, federation members may also contain regular (non-federated) tables whose rows are fully contained within the member. Non-federated tables can contain reference data which is retrieved in combination with the partitioned data (e.g., product information (reference data) and products sales (federated by sales date)).

Federation members can be physically separated from one another (e.g., running at different machines). As such, data at one federation member can also be physically separated from data at other federation members. The schemas for federated and non-federated tables in one federation member may differ from the schemas of tables in other federation members. Schema divergence can be temporary, e.g., to accommodate a new schema version roll-out across a subset of members in a federation, and until federation members eventually converge on the same schema.

A federation can include a root database, which represents an application boundary of the federation. The root database is the "landing pad" or logical endpoint for applications connected to a federation. A root database can contain one or more named federations, each with its own federation scheme defining the federation key. A root database can also contain global data including: application defined (configuration) data, users and passwords, and roles. A root database can also contain versioning information for the federation members or provide distributed query processing abilities.

A federation can also define the distribution policy and the data type to use for the distribution of data. Federations facilitate online copying of data between physical databases, as well as more efficient development of new types of cloud, web, and multi tenant solutions. For example, embodiments of the invention also include using one or more of split, merge, and drop operations to scale data with no downtime. For example, a split operation can be used to scale data out to additional members. On the other hand, a merge operation can be used to scale data in to fewer members.

In some embodiments, a federation creation command is issued to create a database federation. A federation creation command can be of the following format:

```
CREATE FEDERATION federation_name { <federation_distribution_scheme> }
<federation_distribution_scheme> ::= (<federation_distribution>,..n)
<federation_distribution> ::=
distribution_name <data_type> RANGE|HASH|ROUNDROBIN
<data_type> ::=
[ type_name . ] type_name
```

Arguments federation_name

Is the name of the federation. Federation names must be unique within the SQL Azure server and comply with the rules for identifiers and is of type sysname.

type_name

Specifies the type name for federation key type. in v1 we only support a single column. can only be one of bigint, uniqueidentifier or varbinary(n). Where N can be up to 900.

distribution_name

Specifies the name for the federation key. The name is an identifier to refer to federation key and is referred to when federation related statements such as (CREATE TABLE.. FEDERATED ON(..) or USE FEDERATION etc) need to refer to the federation key. distribution_name must conform to the rules for identifiers and is of type sysname.

RANGE|HASH|ROUNDROBIN

Specifies the type of partitioning.

When a federation is created, a first partition covering the full range for the specified data type can also be created. This federation member can be visible as a regular database.

With range distribution, a range_low and range_high can represent the boundary values for the federation member. In the case of a single federation member, range_low represent the minimum value of the domain of the federation key data type and range_high is the maximum value of the domain of the federation key data type.

Federation key data type is used to specify the domain of the values allowed. For the federation members covering the minimum value of the domain the range_low is set to the minimum value allowed in the federation key data type. For federation members covering the maximum value of the domain the range_high is set to the maximum value allowed in the federation key data type.

Range_low value can be inclusive to the range. For example, if a federation member has a range_low of 100, value 100 is in the federation member. On the other hand, Range_high can be exclusive to the range. For example, if a federation member has a range_high of 200, value 200 is not included in the federation member. For the federation member containing the maximum value of the range, the range_high value can be inclusive to the range.

In general, database federations can redistribute (re-partition) their data by changing the federation. Redistribution of the data can happen through various different operations. For example, an alter federation command can be issued to cause a split, merge, or drop operation to occur. In some embodiments, an alter federation command is of the following format:

```
ALTER FEDERATION federation_name
{
   SPLIT AT (distribution_name = boundary_value, ...n)
 | DROP AT ([LOW|HIGH] distribution_name = boundary_value, ...n)
 | MERGE AT ([LOW|HIGH] distribution_name = boundary_value, ...n)
```

}[;]
Arguments
boundary_value

The value specifies the division point for the repartitioning operation. The boundary value should be a valid value for the data type specified by the federation's federation key.

In the case of a split, the value becomes the range_low and range_high for the new set of federation members that is created as part of the split operation.

SPLIT AT (distribution_name=boundary_value)

Moves the data in the federation member into 2 new destination federation members. All rows in federated tables with federation key instances<boundary_value in the federated tables, are copied to one of the new destination federation member. Instances>=boundary_value in the federated tables, are copied to the other new destination federation member.

Figure 1B:
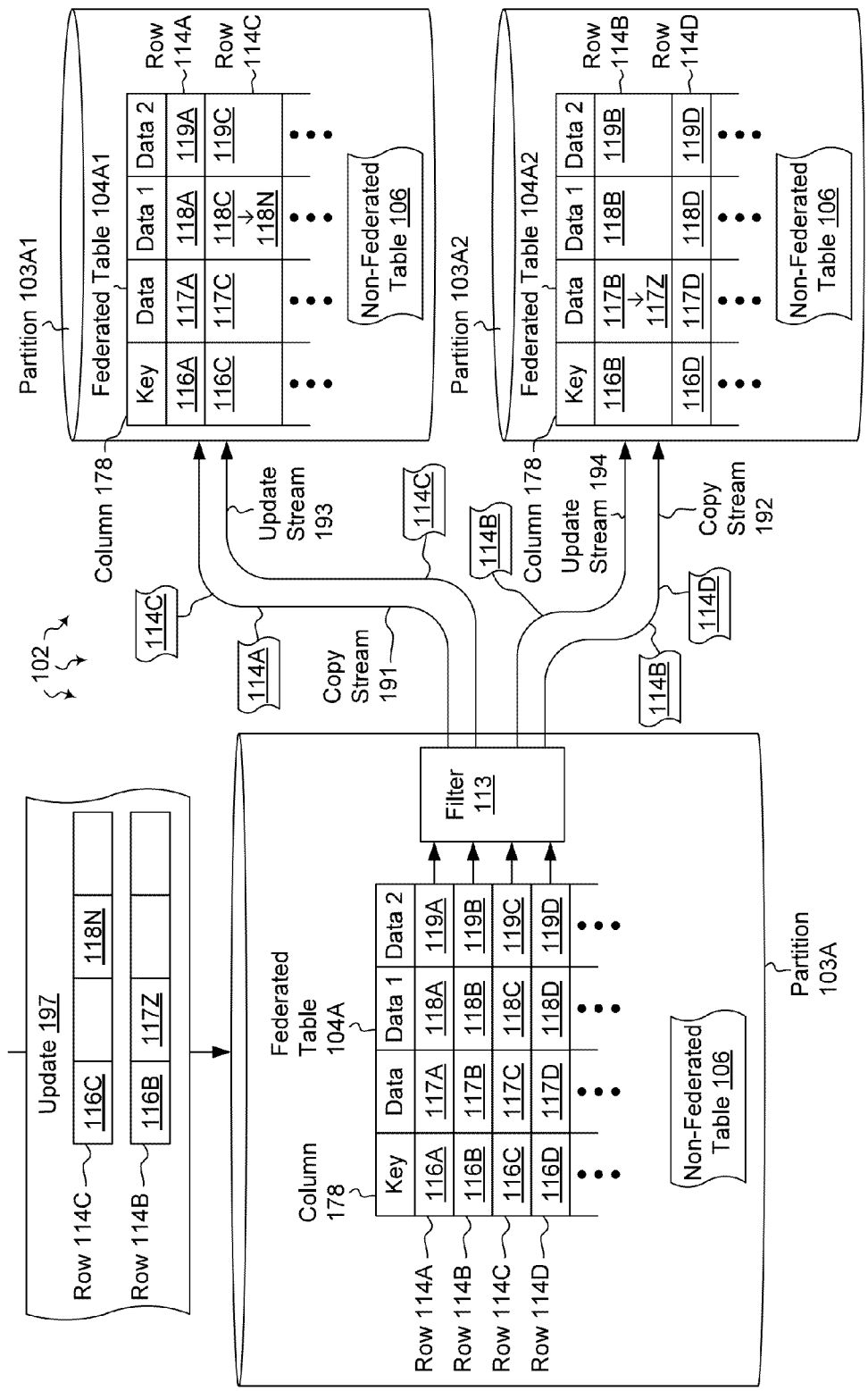

FIGS. 1A and 1B illustrate an example computer architecture 100 that facilitates splitting a database partition. Referring to FIG. 1A, computer architecture 100 includes partitioning module 101 and database federation 102. Each of the depicted components is connected to one another over (or is part of) a network, such as, for example, a Local Area Network ("LAN"), a Wide Area Network ("WAN"), and even the Internet. Accordingly, each of the depicted components as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

As depicted, database federation 102 includes partitions 103A, 103B, and 103C. Some tables can be federated such that the tables are distributed across the partitions 103A, 103B, and 103C. For example, federated tables 104A, 104B, and 104C can each be a distributed part of the same table. Each row of data distributed across the federated tables 104A, 104B, and 104 can be identified by a (e.g., federation) key value. Each partition 103A, 103B, and 103C can be responsible for a subset of key values. In some embodiments, each partition 103A, 103B, and 103C is responsible for a contiguous range of key values. However, other mechanisms for allocating responsibility for key value subsets can be used and the key values within a key value subset need not be contiguous.

Other tables are not federated. For example, partitions 103A, 103B, and 103C contain non-federated tables 106, 107, and 108 respectively. Non-federated tables can store, reference data, or other types of non-federated data.

Figure 2A:
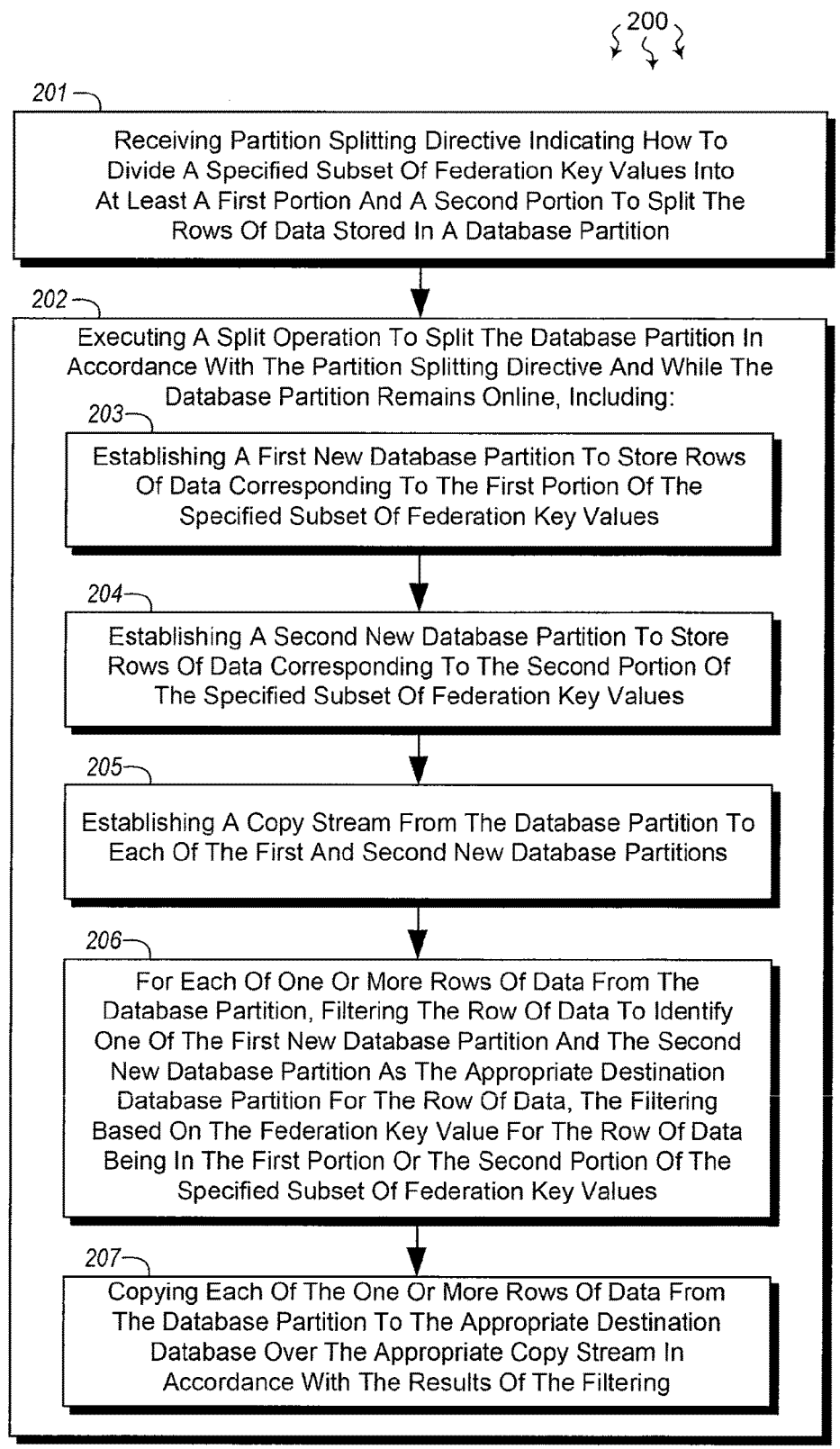
FIG. 2A illustrates a flow chart of an example method for splitting a database partition.

FIG. 2A illustrates a flow chart of an example method 200 for splitting a database partition. Method 200 will be described with respect to the components and data of computer architecture 100.

Method 200 includes an act of receiving a partition splitting directive indicating how to divide the specified subset of federation key values into at least a first portion and a second portion to split the rows of data stored in the database partition (act 201). For example, partition module 101 can receive partition splitting directive 109. Partition splitting directive 109 includes key values portion 181 (one subset of key values subset 183) and key values portion 182 (another subset of key values subset 183). Collectively, key values portions 181 and 182 indicate how to divide key values subset 183 to split the rows of data stored partition 103A.

Method 200 includes an act of executing a split operation to split the database partition in accordance with the partition splitting directive and while the database partition remains online (act 202). For example, partitioning module 101 can execute split operation 112 to split partition database partition 103A in accordance with partition splitting directive 109. Partition 103A can remain online during the execution of split operation 112.

Act 202 can include an act of establishing a first new database partition to store rows of data corresponding to the first portion of the specified subset of federation key values (act 203). For example, database federation 101 can establish partition 103A1 to store rows of data corresponding to key values portion 181. Act 202 can include an act of establishing a second new database partition to store rows of data corresponding to the second portion of the specified subset of federation key values (act 204). For example, database federation 101 can establish partition 103A2 to store rows of data corresponding to key values portion 182.

Act 202 can include an act of establishing a copy stream from the database partition to each of the first and second new database partition (act 205). For example, database federation 101 can establish copy stream 191 from partition 103A to partition 103A1. Similarly, database federation 101 can establish copy stream 192 from partition 103A to partition 103A2.

Act 202 can also include configuring filter 113 at partition 103A. Filter 113 can be used to determine the destination partition for each row of data in federated table 104A based on the federation key value corresponding to the row of data. Rows of data can be filtered for copying to partitions 103A1 or 103A2 or filtered to remain at partition 103A For example, filter 113 can be configured to select rows of data having federation key values in key values portion 181 for copying to partition 103A1. Filter 113 can be configured to select rows of data having federation key values in key values portion 182 for copying to partition 103A2. Filter 113 can be configured to select rows of data having federation key values outside of key values portions 181 and 182 to remain at partition 103A.

Turning now to FIG. 1B, federated table 104A includes rows 114A-114D.

Act 202 can include for each of one or more rows of data from the database partition, an act of filtering the row of data to identify one of the first new database partition and the second new database partition as the appropriate destination database partition for the row of data, the filtering based on the federation key value for the row of data being in the first portion or the second portion of the specified subset of federation key values (act 206). Act 202 can include an act of copying each of the one or more rows of data from the database partition to the appropriate destination database over the appropriate copy stream in accordance with the results of the filtering (act 207).

For example, for each of rows 114A-114D (and other rows in federated table 104A), filter 113 can identify one of partition 103A1 and 103A2 as the appropriate destination for the row. Filter 113 can filter based on federation key values in key column 178 being in key values portion 181 or key values portion 182. Each filtered row can be copied to partition 103A1 or partition 103A2 over copy stream 191 or 192 respectively.

For example, filter 113 can identify partition 104A1 as the appropriate destination for rows 114A and 114C based on federation key values 116A and 116C being included in key values portion 181. Rows 114A and 114C can be copied over copy stream 191 to partition 103A1 and stored in federated table 104A1. Similarly, filter 113 can identify partition 104A2 as the appropriate destination for rows 114B and 114D based on federation key values 116B and 116B being included in key values portion 182. Rows 114B and 114D can be copied over copy stream 192 to partition 103A2 and stored in federated table 104A2.

Prior to completing execution of split operation 112, values within one or more rows of partition 103A can be updated. Database federation 102 can compensate for updates using update streams.

Figure 2B:
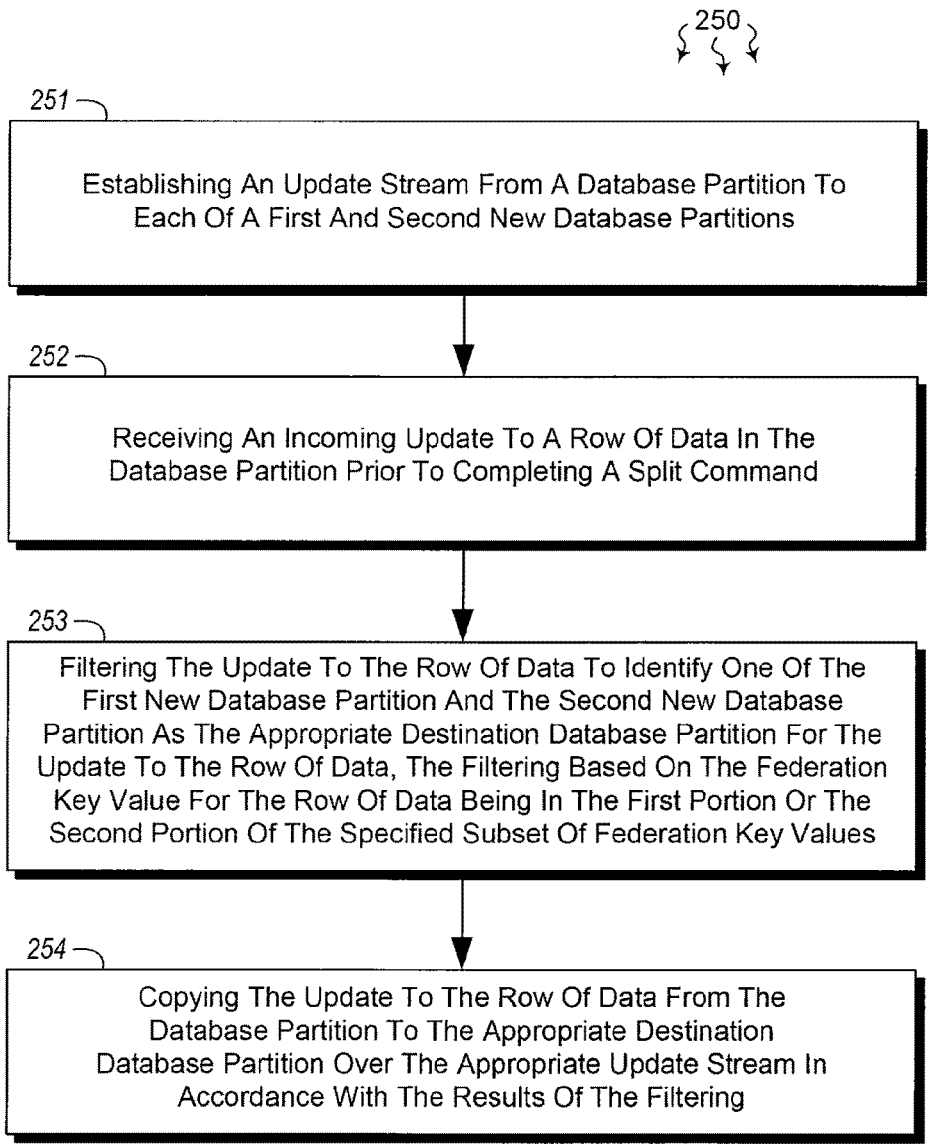
FIG. 2B illustrates a flow chart of an example method for splitting a database partition.

FIG. 2B illustrates a flow chart of an example method 250 for splitting a database partition. Method 250 will be described with respect to the components and data of computer architecture 100.

Method 250 includes an act of establishing an update stream from the database partition to each of the first and second new database partitions (act 251). For example, update stream 193 can be established from partition 103A to partition 103A1. Update stream 194 can be established from partition 103A to partition 103A2. Method 250 includes an act of receiving an incoming update to a row of data in the database partition prior to completing the split command (act 252). For example, partition 103A can receive update 197 prior to completion of split operation 112. Update 197 changes a value in row 114C and a value in row 114B.

Method 250 includes an act of filtering the update to the row of data to identify one of the first new database partition and the second new database partition as the appropriate destination database partition for the update to the row of data, the filtering based on the federation key value for the row of data being in the first portion or the second portion of the specified subset of federation key values (act 253). Method 250 includes an act of copying the update to the row of data from the database partition to the appropriate destination database partition over the appropriate update stream in accordance with the results of the filtering (act 254).

For example, filter 113 can identify partition 103A1 as the appropriate destination for the update to row 114C based on federation key values 116C being included in key values portion 181. The update to row 114C can be copied over update stream 193 to partition 103A1 and stored in federated table 104A1. The update to row 114C can overwrite the value in column Data 1 from 118C to 118N.

Similarly, filter 113 can identify partition 103A2 as the appropriate destination for the update to row 114B based on federation key values 116B being included in key values portion 182. The update to row 114D can be copied over update stream 194 to partition 103A2 and stored in federated table 104A2. The update to row 114B can overwrite the value in column Data from 117B to 117Z.

Accordingly, rows of data in federated table 104A can be split between federated table 104A1 and 104A2 (with some rows potentially remaining at federated table 104A) based on federation key values. Update streams can be used to propagate received updates to federated tables 104A1 and 104A2 until split operation 112 is complete.

Non-federated table 106 can be copied in its entirety to each of partitions 103A1 and 103A2.

In some embodiments, a split operation is of a format similar to:

```
ALTER FEDERATION federation_name
{
    SPLIT [AT (distribution_name = boundery_value,..n)]
}
```

SPLIT AT (boundary_value) moves the data in a federation member into two new destination federation members. Rows in federated tables with federation key instances<boundary_value in the federated tables, are copied to one of the new destination federation member. Rows in federated tables with federation key instances>=boundary_value in the federated tables, are copied to the other new destination federation member.

When SPLIT is executing, all regular (i.e., non-federated) objects schemas and system metadata are copied from the source federation member that is being SPLIT to the destination federation members. This list includes one or more of: users, roles, object permissions, sprocs, views, federated or reference tables, indexes and more. All federated table schemas can be copied from the source federation member that is being SPLIT to the destination federation members. User data in federated tables can be moved to the destination federation members based on the boundary value to the corresponding destination federation member. User data in other objects can be cloned and moved to the destination federation members.

When SPLIT is complete, new destination federation members contain all up to date data from the source federation member. The source federation member can retained or dropped.

Figure 3A:
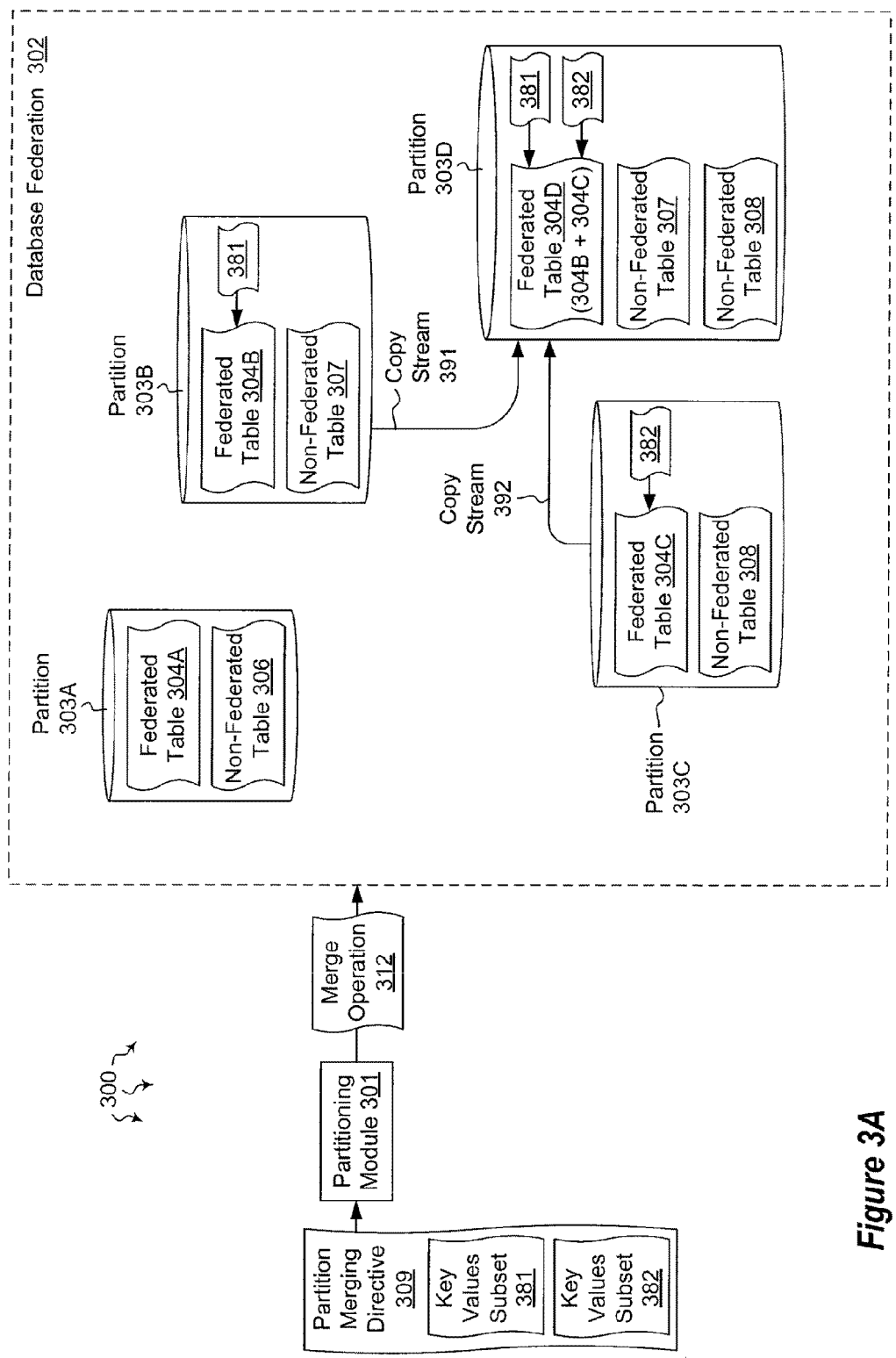
FIGS. 3A and 3B illustrate an example computer architecture that facilitates merging a database partition.
Figure 3B:
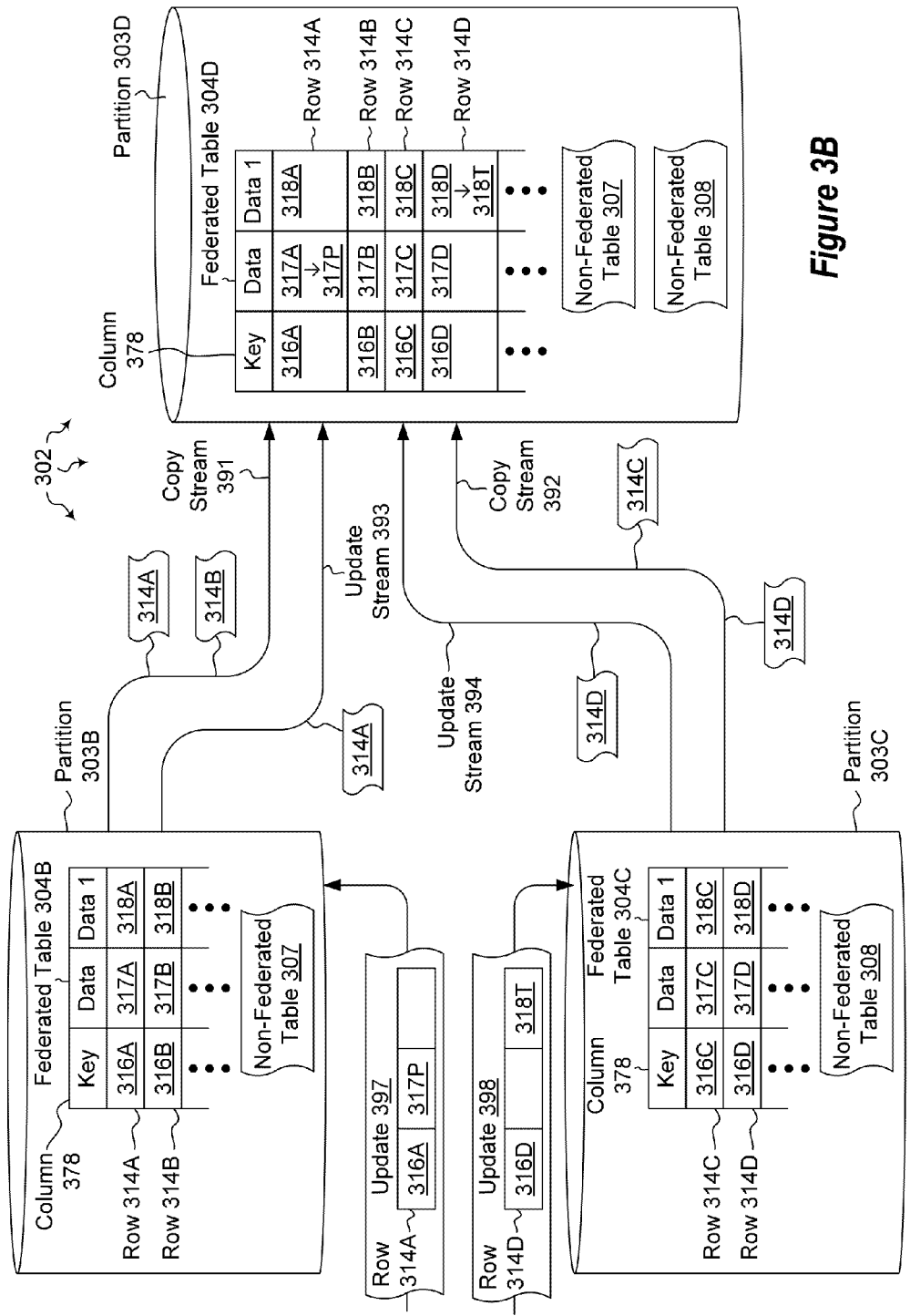

FIGS. 3A and 3B illustrate an example computer architecture 100 that facilitates merging a database partition. Referring to FIG. 3A, computer architecture 300 includes partitioning module 301 and database federation 302. Each of the depicted components is connected to one another over (or is part of) a network, such as, for example, a Local Area Network ("LAN"), a Wide Area Network ("WAN"), and even the Internet. Accordingly, each of the depicted components as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

As depicted, database federation 302 includes partitions 303A, 303B, and 303C. Some tables can be federated such that the tables are distributed across the partitions 303A, 303B, and 303C. For example, federated tables 304A, 304B, and 304C can each be a distributed part of the same table. Each row of data distributed across the federated tables 304A, 304B, and 304C can be identified by a (e.g., federation) key value. Each partition 303A, 303B, and 303C can be responsible for a subset of key values. In some embodiments, each partition 303A, 303B, and 303C is responsible for a contiguous range of key values. However, other mechanisms for allocating responsibility for key value subsets can be used and the key values within a key value subset need not be contiguous.

Other tables are not federated. For example, partitions 303A, 303B, and 303C contain non-federated tables 306, 307, and 308 respectively. Non-federated tables can store, reference data, or other types of non-federated data.

Figure 4A:
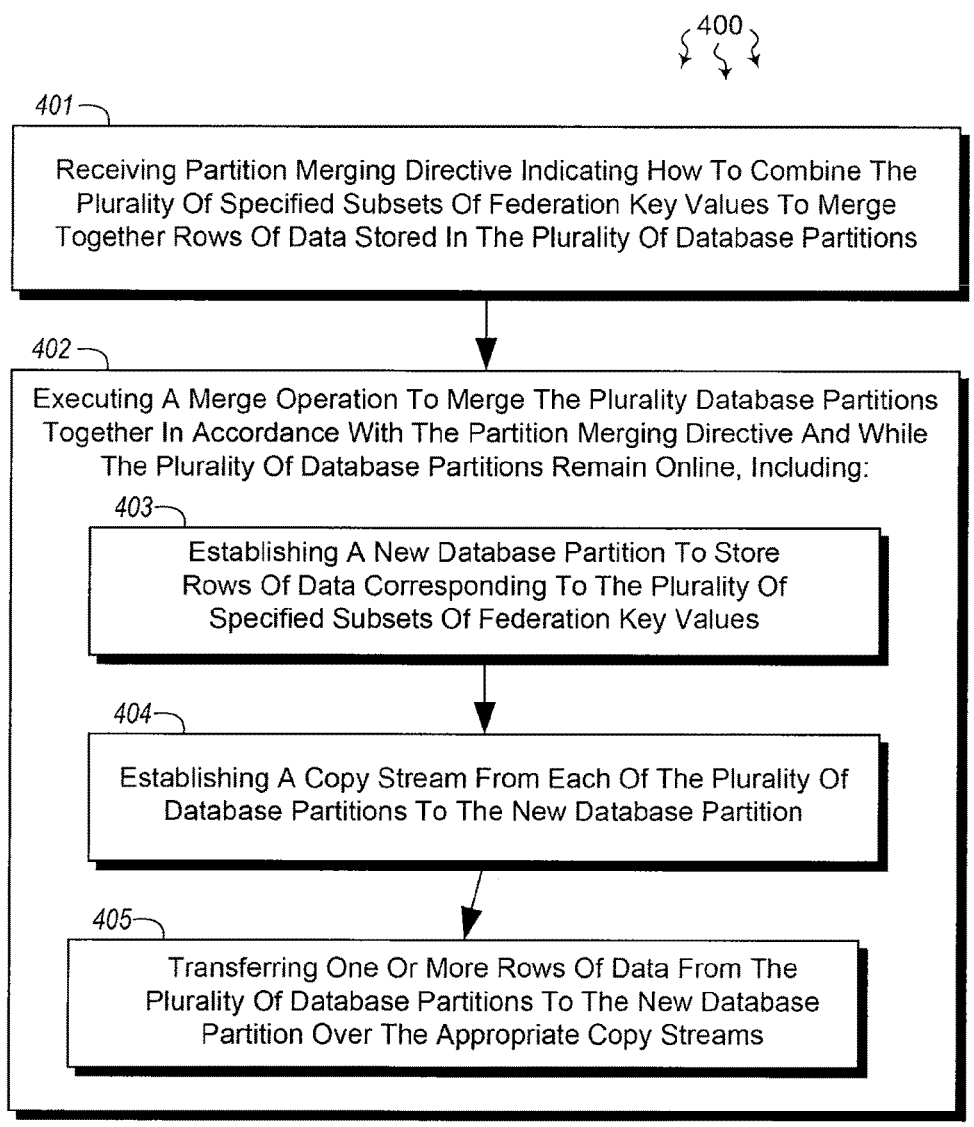
FIG. 4A illustrates a flow chart of an example method for merging a database partition.

FIG. 4A illustrates a flow chart of an example method 400 for merging a database partition. Method 400 will be described with respect to the components and data of computer architecture 300.

Method 400 includes an act of receiving a partition merging directive indicating how to combine the plurality of specified subsets of federation key values to merge together rows of data stored in the plurality of database partitions (act 401). For example, partition module 301 can receive partition merging directive 309. Partition merging directive 309 includes key values subset 381 and key values subset 382. Partition merging directive 309 can indicate how to combine key values subset 381 and key values subset 382 to merge together rows of data stored in partitions 303A, 303B, and 303C.

Method 400 includes an act of executing a merge operation to merge the plurality database partitions together in accordance with the partition merging directive and while the plurality of database partitions remain online (act 402). For example, partitioning module 301 can execute merge operator 312 to merge rows of data from partition 303B with rows of data from partition 303C in accordance with partition merging directive 309. Partitions 303B and 303C can remain online during the execution of merge operation 312.

Method 400 includes an act of establishing a new database partition to store rows of data corresponding to the plurality of specified subsets of federation key values (act 403). For example, database federation can establish partition 303D to store rows of data corresponding to key values subsets 381 and 382 (in federated table 304D).

Method 400 includes an act of establishing a copy stream from each of the plurality of database partitions to the new database partition (act 404). For example, database federation 301 can establish copy stream 391 from partition 303B to partition 303D. Similarly, database federation 301 can establish copy stream 392 from partition 303C to partition 303D.

Turning now to FIG. 3B, federated table 304B includes rows 314A-314B. Similarly, federated table 304C includes rows 314C and 314D. Key column 378 stores federation key values for the rows of data. For example, rows 314A, 314B, 314C, and 314D correspond to key values 316A, 316B, 316C, and 316D respectively. Key values 316A and 316B can be included in key values subset 381. Similarly, key values 316C and 316D can be included in key values subset 382.

Method 400 includes an act of transferring one or more rows of data from the plurality of database partitions to the new database partition over the appropriate copy streams (act 405). For example, rows 314A and 314B can be copied from partition 303B to partition 303D over copy stream 391. Similarly, rows 314C and 314D can be copied from partition 303C to 303D over copy stream 392.

Accordingly, rows 314A-314D are merged into federated table 304D.

Prior to completing execution of merge operation 312, values within one or more rows of partitions 303B and/or 303D can be updated. Database federation 302 can compensate for updates using update streams.

Figure 4B:
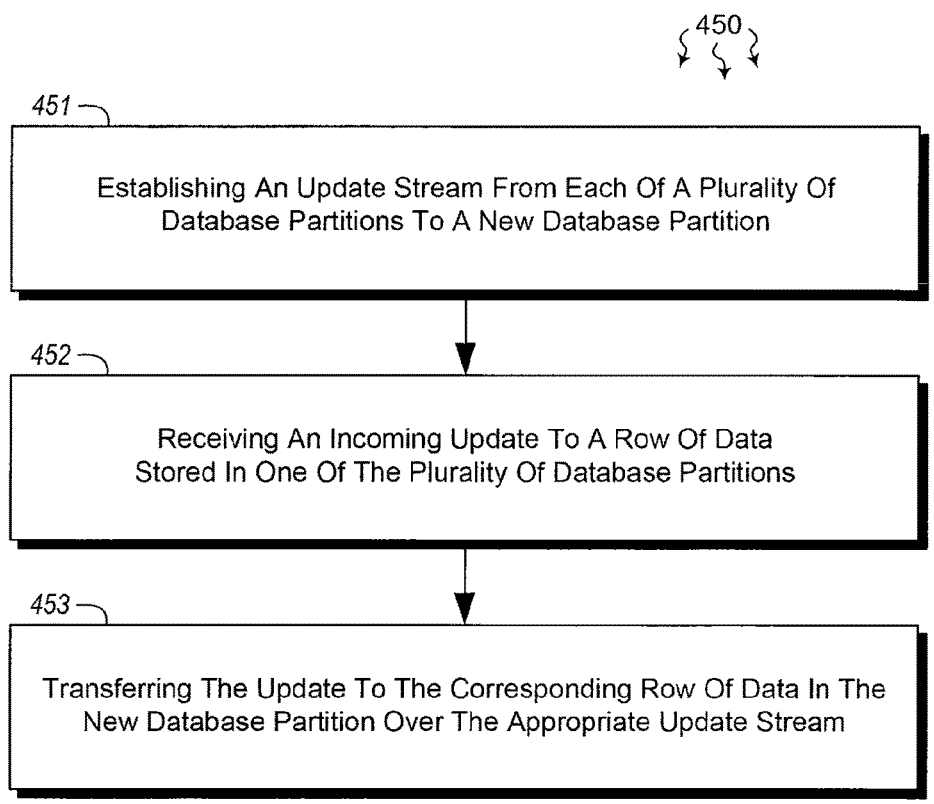
FIG. 4B illustrates a flow chart of an example method for merging a database partition.

FIG. 4B illustrates a flow chart of an example method 450 for merging a database partition. Method 450 will be described with respect to the components and data of computer architecture 300.

Method 450 includes an act of establishing an update stream from each of plurality of database partitions to the new database partition (act 451). For example, database federation 301 can establish update stream 393 from partition 303B to partition 303D. Similarly, database federation 301 can establish update stream 394 from partition 303C to partition 303D.

Method 450 includes an act of receiving an incoming update to a row of data stored in one of the plurality of database partitions (act 452). For example, partition 303B can receive update 397 prior to completion of merge operation 312. Update 397 changes a value in row 314A. Similarly, partition 303C can receive update 398 prior to completion of merge operation 312. Update 398 changes a value in row 314D.

Method 450 includes an act of transferring the update to the corresponding row of data in the new database partition over the appropriate update stream (act 453). For example, partition 303B can copy the update to row 314A over update stream 393 to partition 303D. The update to row 314A can overwrite the value in column Data from 317A to 317P. Similarly, partition 303C can copy the update to row 314D over update stream 394 to partition 303D. The update to row 314D can overwrite the value in column Data 1 from 318D to 318T.

Accordingly, rows of data in federated tables 304B and 304C can be merged into federated table 304D (with some rows potentially remaining at federated tables 304B and 304C) based on federation key values. Update streams can be used to propagate received updates to federated table 304D until merge operation 312 is complete.

Non-federated tables 307 and 308 can be copied in their entirety to partition 303D.

In some embodiments, a merge operation is of a format similar to:

ALTER FEDERATION federation_name
{
 | MERGE [AT ([LOW|HIGH] distribution_name=boundary_value_range,..n)
}

MERGE AT (boundary_value_range) moves data within the boundary_value range distributed across two of more federation members into a single new destination federation member. Rows in federated tables with federation key instances at the edges of the boundary_value_range can be included or excluded form the merge based on configuration.

When MERGE is executing, all regular (i.e., non-federated) objects schemas and system metadata are copied from the source federation members that are being MERGE to the destination federation member. This list includes one or more of: users, roles, object permissions, sprocs, views, federated or reference tables, indexes and more. All federated table schemas can be copied from the source federation members that are being MERGE to the destination federation member. User data in federated tables can be moved to the destination federation member based on the boundary value to the corresponding destination federation member. User data in other objects can be cloned and moved to the destination federation member.

When MERGE is complete, the new destination federation member contains all up to date data from the source federation members. The source federation members can retained or dropped.

Figure 5A:
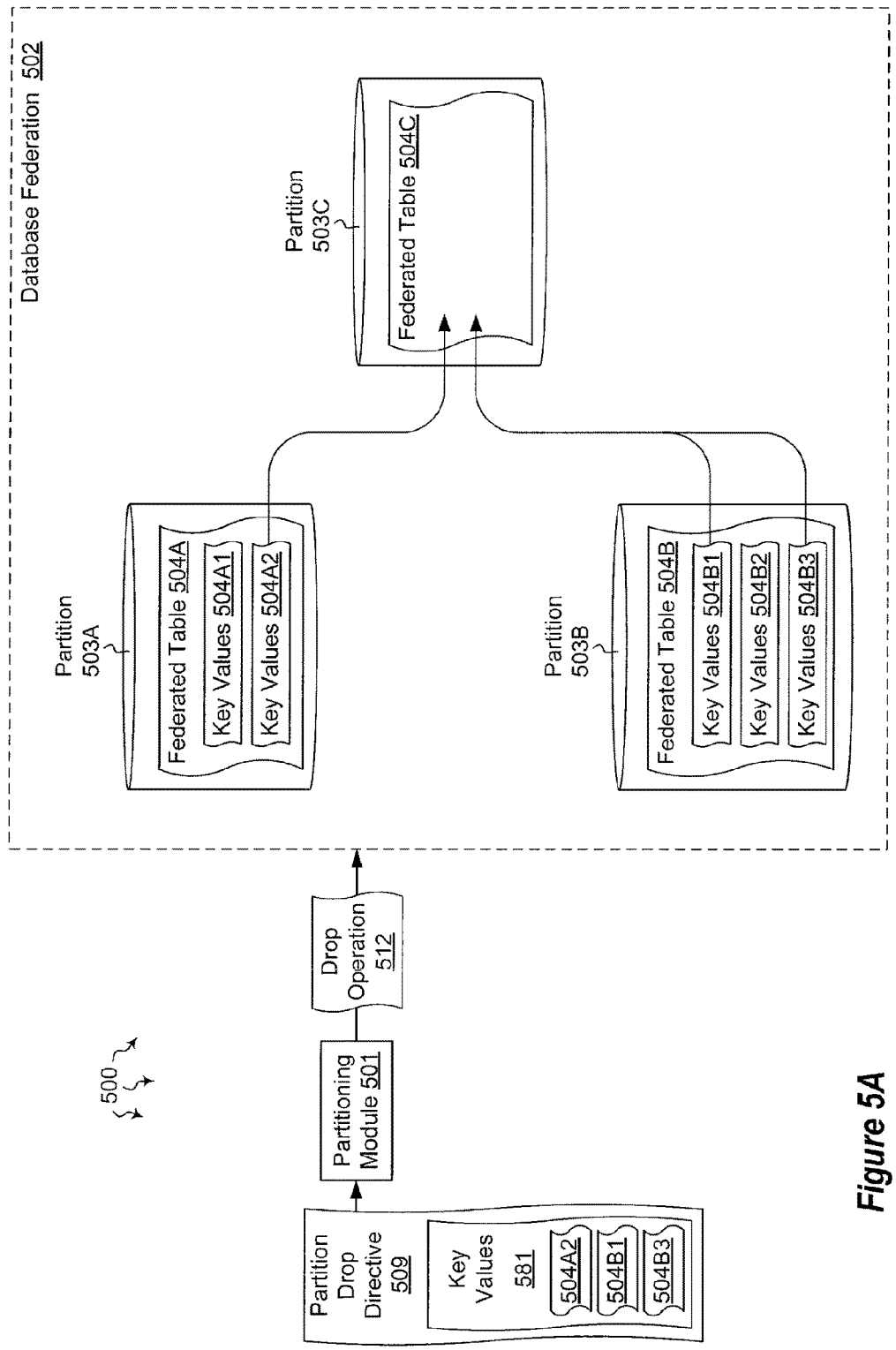
FIGS. 5A and 5B illustrate an example computer architecture that facilitates dropping rows from a distributed database.
Figure 5B:
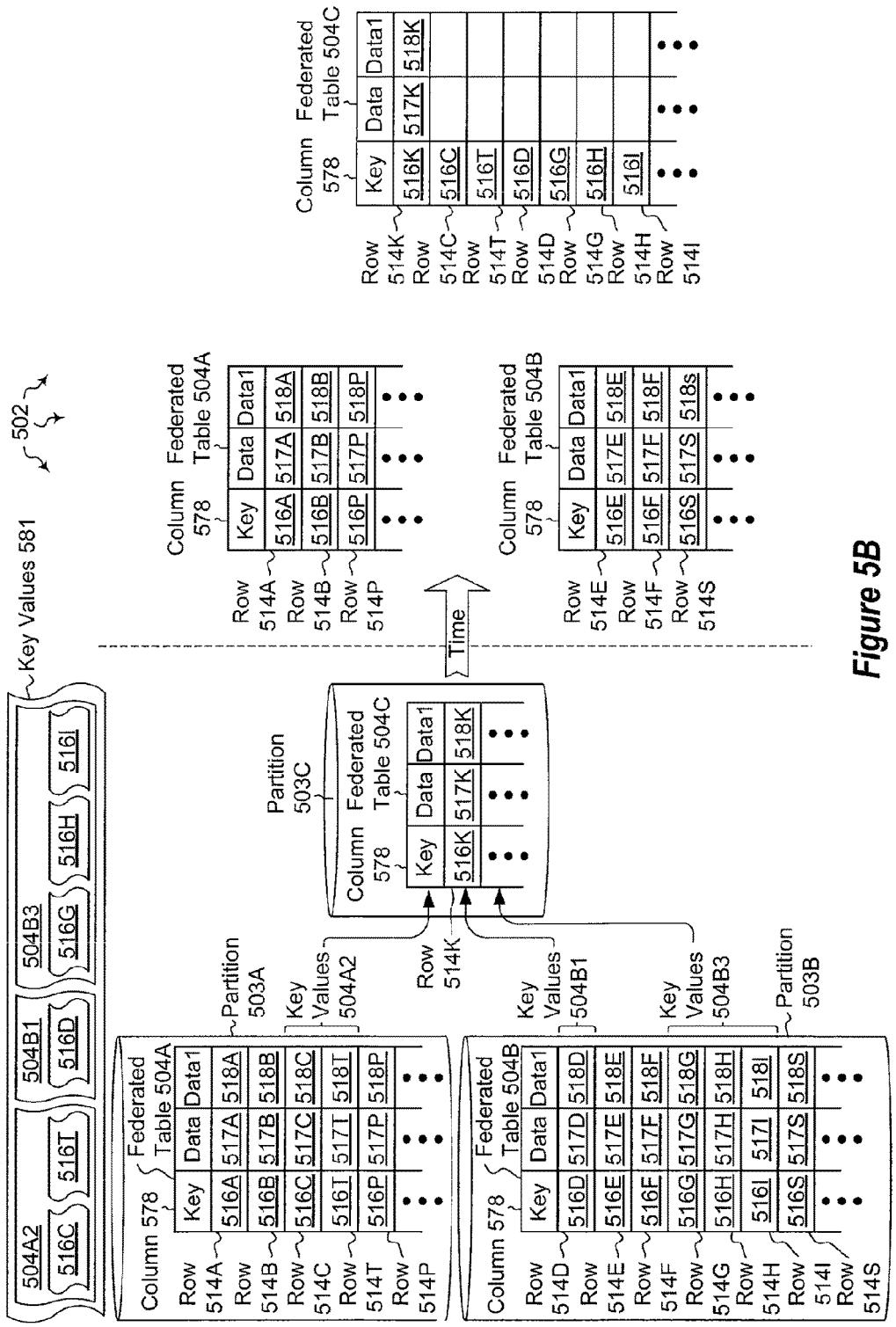

FIGS. 5A and 5B illustrate an example computer architecture 500 that facilitates dropping rows from a distributed database. Referring to FIG. 5A, computer architecture 500 includes partitioning module 501 and database federation 502. Each of the depicted components is connected to one another over (or is part of) a network, such as, for example, a Local Area Network ("LAN"), a Wide Area Network ("WAN"), and even the Internet. Accordingly, each of the depicted components as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

As depicted, database federation 502 includes partitions 503A, 503B, and 503C. Federated tables 504A, 504B, and 504C can each be a distributed part of the same table. Each row of data distributed across the federated tables 504A, 504B, and 504C can be identified by a (e.g., federation) key value. Each partition 503A, 503B, and 503C can be responsible for a subset of key values. In some embodiments, each partition 503A, 503B, and 503C is responsible for a contiguous range of key values. However, other mechanisms for allocating responsibility for key value subsets can be used and the key values within a key value subset need not be contiguous.

Federated table 504A stores rows of data corresponding to key values 504A1 and 504A2. Federated table 504B stores rows of data corresponding to key values 504B1, 504B2, and 504B3.

Figure 6:
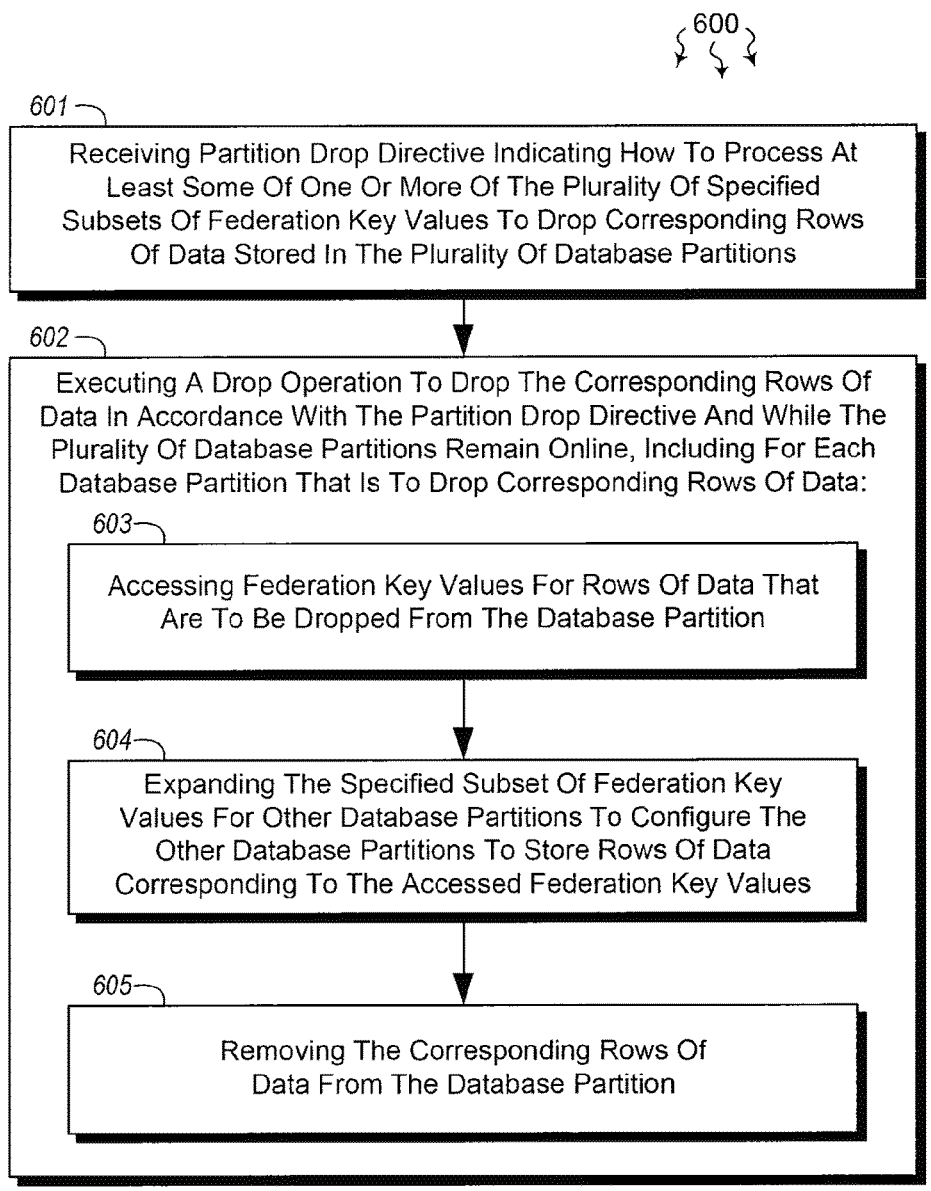
FIG. 6 illustrates a flow chart of an example method for dropping rows from a distributed database.

FIG. 6 illustrates a flow chart of an example method 600 for dropping rows from a distributed database. Method 600 will be described with respect to the components and data of computer architecture 500.

Method 600 includes an act of receiving a partition drop directive indicating how to process at least some of one or more of the plurality of specified subsets of federation key values to drop corresponding rows of data stored in the plurality of database partitions (act 601). For example, partitioning module 501 can receive partition drop directive 509. Partition drop directive 509 can indicate how to process key values 581 to drop corresponding rows of data stored in federated tables 504A and 504B. Key values 581 include key values 504A2, 504B1, and 504B3.

Method 600 includes, an act of executing a drop operation to drop the corresponding rows of data in accordance with the partition drop directive and while the plurality of database partitions remain online (act 602). For example, partitioning module 501 can execute drop operation 512 to drop corresponding rows in accordance with partition drop directive 509. Partitions 503A, 503B, and 503C can remain online during the execution of drop operation 512.

Turning now to FIG. 5B, federated table 504A includes rows 514A-514C, 514T, and 514P. Similarly, federated table 504C includes rows 514D-514I and 514S. Key column 378 stores federation key values for the rows of data. For example, rows 514A-514C, 514T, and 514P correspond to key values 516A-516C, 516T, and 516P respectively. Similarly, rows 514D-514I and 514S correspond to key values 516D-516I and 516S respectively.

Key values 516C and 516T are included in key values 504A2. Similarly, key value 516D is included in key values 504B1. Likewise, key values 516G-516I are included in key values 504B3.

Act 602 includes, for each database partition that is to drop corresponding rows of data, an act of accessing federation key values for rows of data that are to be dropped from the database partition (act 603). For example, database federation 502 can access federation key values 516C and 516T for rows 514C and 514T respectively that are to be dropped partition 503A. Similarly, database federation 502 can access federation key values 516D, 516G, 516H, and 516I for rows 514D, 514G, 514H, and 514I respectively that are to be dropped partition 503B.

Act 602 includes, for each database partition that is to drop corresponding rows of data, an act of expanding the specified subset of federation key values for other database partitions to configure the other database partitions to store rows of data corresponding to the accessed federation key values (act 604). For example, database federation 502 can expand the subset of federation values for partition 503C to configure federated table 504C store rows 514C, 514T, 514D, 514G, 514H, and 514I. Values in columns Data and Data 1 for rows 514C, 514T, 514D, 514G, 514H, and 514I can be left empty.

Act 602 includes, for each database partition that is to drop corresponding rows of data, an act of removing the corresponding rows of data from the database partition (act 605). For example, database federation 502 can remove rows 514C and 514T from federated table 504A. Similarly, database federation 502 can remove rows 514D, 514G, 514H, and 514I form federated table 504B.

In some embodiments, a drop operation is of a format similar to:

```
ALTER FEDERATION federation_name
{
  DROP [AT ([LOW|HIGH} distribution_name = boundary_value,...n)]
}
```

A drop operation can be used to move rows to a new partition and drop the rows from previous partitions federation. DROP AT drops a row and extends an adjacent federation members range to cover the gap created by the drop. The drop operation can impact both the federation member being dropped and the adjacent federation member that is being extended to cover the gap. The boundary value can correspond to an existing range value in the federation.

More specifically, DROP AT (LOW distribution_name=boundary_value) drops a federation member to the database covering the lower set of values of the boundary value and extends the federation member to the right of the boundary value. For example, for a list of federation members covering 0,100 (db1) and 100,200 (db2) and 200,300 (db3):

1. Issue ALTER FEDERATION fed1 DROP AT (LOW customer_id=200)
2. db2 and all data between 100,200 is dropped.
3. Remaining set of federation members are 0,100 (db1) and 100,300 (db4)
4. db4 essentially contains a new range and all data and schema from federation member db3.

On the other hand, DROP AT (HIGH distribution_name=boundary_value) drops federation member to the HIGH of the boundary value and extends the federation member to the lower side of the boundary value. For example, for a list of federation members covering 0,100 (db1) and 100,200 (db2) and 200,300 (db3):

1. Issue ALTER FEDERATION fed1 DROP AT (HIGH customer_id=200)
2. db2 and all data between 200,300 is dropped.
3. Remaining set of federation members are 0,100 (db1) and 100,300 (db4)
4. db4 essentially contains a new range and all data and schema from federation member db2.

Depending on the LOW or the HIGH option, the corresponding federation member can be dropped and remaining federation member is expanded to cover the full range. When DROP is done, a remaining federation member covers the full range without the boundary value. The remaining federation member can be renamed.

Federations can also be completely dropped using a drop federation operation. A drop federation command can be issued to cause a drop federation operation to occur. A drop federation command can be of the following format:

DROP FEDERATION federation_name

Dropping federations cleans up metadata, logical objects about the federation and drop its federation members.

As previously described, federations can be created in any regular database. The database that contains federations is also referred to as the federation root. The federation root can maintain metadata for the federation. A Federation root can also be utilized to store centralized information, app configuration information or global reference data.

Federation members can be viewed as containers for part of federation's data. Federation member data can be backed up by a physical database. The collection of all federation members in a federation represents the full dataset for a collection of tables such as 'all customers' and 'all orders'. However, each federation member contains a subset of the full dataset (which may or may not be evenly distributed across members). Programmability surface operations such as DDL, DML operations and querying capabilities of regular databases can be supported in federation members.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, implemented at a distributed database system that includes one or more processors and system memory, for dropping rows of data within the distributed database system, the distributed database system storing a federated table comprising a plurality of rows across a plurality of database partitions of a federated database, the plurality of database partitions including a first database partition that stores a first subset of the plurality of rows and a second database partition that stores a second different subset of the plurality of rows, each of the plurality of rows being identified by a corresponding federation key value, the first database partition storing the first subset of rows based on the corresponding federation key value of each row in the first subset of rows being within a first specified subset of a plurality of federation key values, the second database partition storing the second subset of rows based on the corresponding federation key value of each row in the second different subset of rows being within a second specified subset of the plurality of federation key values, the method comprising:

receiving a drop directive indicating a third specified subset of the plurality of federation key values to drop, the third specified subset of federation key values comprising: (i) one or more first federation key values from the first specified subset of federation key values, and (ii) one or more second federation key values from the second specified subset of federation key values; and executing a drop operation to drop rows corresponding to the third specified subset of federation key values while the plurality of database partitions remain online, including:

identifying (i) one or more first rows from the first subset of rows in the first database partition that correspond to the one or more first federation key values, and (ii) one or more second rows from the second subset of rows in the second database partition that correspond to the one or more second federation key values;

creating a new third database partition within the distributed database system;

expanding the one or more first rows and the one or more second rows into the third database partition; and dropping the one or more first rows from the first database partition and dropping the one or more second rows from the second database partition.

2. The method as recited in claim 1, further comprising assigning the third specified subset of federation key values to the third database partition.

3. The method as recited in claim 1, wherein one or more data fields of the one or more first and one or more second rows that are expanded into the third database partition are left blank.

4. The method as recited in claim 1, wherein the third specified subset of federation key values is defined according to a low directive that drops federation key values that are below a defined boundary.

5. The method as recited in claim 1, wherein the third specified subset of federation key values is defined according to a high directive that drops federation key values that are above a defined boundary.

6. A computing system for use in a distributed database system, the distributed database system storing a federated table comprising a plurality of rows across a plurality of database partitions of a federated database, the plurality of database partitions including a first database partition that stores a first subset of the plurality of rows and a second database partition that stores a second different subset of the plurality of rows, each of the plurality of rows being identified by a corresponding federation key value, the first database partition storing the first subset of rows based on the corresponding federation key value of each row in the first subset of rows being within a first specified subset of a plurality of federation key values, the second database partition storing the second subset of rows based on the corresponding federation key value of each row in the second different subset of rows being within a second specified subset of the plurality of federation key values, the computing system including:
one or more processors; and
system memory having stored thereon computer-executable instructions which, when executed by the one or more processors, cause the computing system to drop rows of data from the distributed database system, the computer-executable instructions including instructions that are executable to configure the computing system to perform at least the following:
receive a drop directive indicating a third specified subset of the plurality of federation key values to drop, the third specified subset of federation key values comprising: (i) one or more first federation key values from the first specified subset of federation key values, and (ii) one or more second federation key values from the second specified subset of federation key values; and
execute a drop operation to drop rows corresponding to the third specified subset of federation key values while the plurality of database partitions remain online, including:
identifying (i) one or more first rows from the first subset of rows in the first database partition that correspond to the one or more first federation key values, and (ii) one or more second rows from the second subset of rows in the second database partition that correspond to the one or more second federation key values;
creating a new third database partition within the distributed database system;
expanding the one or more first rows and the one or more second rows into the third database partition; and
dropping the one or more first rows from the first database partition and dropping the one or more second rows from the second database partition.

7. The computing system of claim 6, the computer-executable instructions also including instructions that are executable to configure the computing system assign the third specified subset of federation key values to the third database partition.

8. The computing system of claim 6, wherein one or more data fields of the one or more first and one or more second rows that are expanded into the third database partition are left blank.

9. The computing system of claim 6, wherein the third specified subset of federation key values is defined according to a low directive that drops federation key values that are below a defined boundary.

10. The computing system of claim 6, wherein the third specified subset of federation key values is defined according to a high directive that drops federation key values that are above a defined boundary.

11. A computer-readable memory device for use in a distributed database system, the distributed database system storing a federated table comprising a plurality of rows across a plurality of database partitions of a federated database, the plurality of database partitions including a first database partition that stores a first subset of the plurality of rows and a second database partition that stores a second different subset of the plurality of rows, each of the plurality of rows being identified by a corresponding federation key value, the first database partition storing the first subset of rows based on the corresponding federation key value of each row in the first subset of rows being within a first specified subset of a plurality of federation key values, the second database partition storing the second subset of rows based on the corresponding federation key value of each row in the second different subset of rows being within a second specified subset of the plurality of federation key values, the computing system including, the computer-readable memory device having stored thereon computer-executable instructions which that are executable by one or more processors of a computer system to cause the computer system to drop rows of data from the distributed database system, the computer-executable instructions including instructions that are executable to configure the computer system to perform at least the following:
receive a partition drop directive indicating a third specified subset of the plurality of federation key values to drop, the third specified subset of federation key values comprising: (i) one or more first federation key values from the first specified subset of federation key values, and (ii) one or more second federation key values from the second specified subset of federation key values; and
execute a drop operation to drop rows corresponding to the third specified subset of federation key values while the plurality of database partitions remain online, including:
identifying (i) one or more first rows from the first subset of rows in the first database partition that correspond to the one or more first federation key values, and (ii) one or more second rows from the second subset of rows in the second database partition that correspond to the one or more second federation key values;
creating a new third database partition within the distributed database system;
expanding the one or more first rows and the one or more second rows into the third database partition; and
dropping the one or more first rows from the first database partition and dropping the one or more second rows from the second database partition.

12. The computer-readable memory device of claim 11, the computer-executable instructions also including instructions that are executable to configure the computing system assign the third specified subset of federation key values to the third database partition.

13. The computer-readable memory device of claim 11, wherein one or more data fields of the one or more first and one or more second rows that are expanded into the third database partition are left blank.

14. The computer-readable memory device of claim 11, wherein the third specified subset of federation key values is defined according to a low directive that drops federation key values that are below a defined boundary.

15. The computer-readable memory device of claim 11, wherein the third specified subset of federation key values is defined according to a high directive that drops federation key values that are above a defined boundary.

* * * * *